Oct. 22, 1935.  G. WEISS  2,018,044
MACHINE FOR SEPARATING THE CONTENTS OF EGGS
Filed Oct. 13, 1930  9 Sheets-Sheet 4

Fig. 4

Inventor:
George Weiss
By [signature]
Atty.

Oct. 22, 1935.  G. WEISS  2,018,044
MACHINE FOR SEPARATING THE CONTENTS OF EGGS
Filed Oct. 13, 1930   9 Sheets-Sheet 8

Inventor
George Weiss

Oct. 22, 1935.  G. WEISS  2,018,044
MACHINE FOR SEPARATING THE CONTENTS OF EGGS
Filed Oct. 13, 1930  9 Sheets-Sheet 9

Patented Oct. 22, 1935

2,018,044

UNITED STATES PATENT OFFICE 2,018,044

MACHINE FOR SEPARATING THE CONTENTS OF EGGS

George Weiss, Chicago, Ill.

Application October 13, 1930, Serial No. 488,418

20 Claims. (Cl. 146—2)

This invention relates to improvements in machines for opening eggs and separating the contents thereof, and one of the objects of the invention is to provide improved means for automatically opening the egg, removing the contents from the shell, separating the contents, and then ejecting the shell from the machine.

A further object is to provide in a machine of this character improved means for feeding or delivering the eggs into the machine.

A further object is to provide an improved holder for the eggs and improved means for centering the eggs with respect to the holding means.

A further object is to provide improved means for separating the albumen from the yolk.

A further object is to provide an improved machine of this character which will be of a simple, durable and compact construction and effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which

Figure 7ª is a detail sectional view of the egg lifting means, with parts omitted.

Figure 10ª is a detail top plan view of a portion of the cam showing the extremities of the cam.

The mechanism is mounted upon any suitable supporting base 20, which may itself be supported by means of legs or supports 21.

Projecting above the base 20 are uprights 22 of any desired configuration and journaled in the uprights is a shaft 23, which constitutes the main supporting shaft, this shaft receiving its motion from any suitable source, preferably through the medium of a pulley 24, suitably supported. Connected with the pulley to rotate therewith is a gear 25, which meshes with a gear 26 that is journaled upon a stub shaft 27, carried by one of the uprights 22. Connected to the gear 26 to rotate therewith is a gear 28 which in turn meshes with a gear 29 carried by a shaft 30, the latter being journaled in the uprights 22, the gears 25, 26, 28 and 29 being located on one side of the machine.

The shaft 30 constitutes a time shaft for the operating mechanism, and secured to the shaft 30 on the opposite side of the machine is the driving element 31 of a Geneva movement, this driving element being provided with a lateral projection 32 preferably in the form of a roller, and the element 31 co-operates with the other Geneva element 33, the latter being provided with openings 34 into which the roller or projection 32 enters for the purpose of imparting an intermittent rotation to the element 33 and also the shaft 23.

Encompassing the shaft 23 at each end thereof are sleeves 35 which are journaled in the uprights 22 and form the bearings for the shaft 23, the shaft and sleeves being rotatable with respect to each other.

Connected with the shaft 23 are laterally spaced members 36 of any desired diameter and configuration, but are preferably of a drum like formation having a series of openings 37 extending transversely therethrough adjacent the periphery thereof, and any number of openings 37 may be provided, according to the number of steps of operation which it is desired to employ in receiving and advancing the eggs to the different stations, where certain operations are performed and the egg shell finally opened to entirely discharge the contents therefrom into a separating machine.

In the present form of the invention there are shown four stations, at the first station the egg will be received into the machine between the members 36 to be advanced to the second station, where the shell is cut.

The egg is then advanced to the third station where the parts of the shell are separated so as to empty the contents of the egg and the emptied shells are then advanced to the fourth station, where they are ejected.

The eggs are received between the members 36 and held by suitable holders, and as the construction and operation of each of the holders is the same, the description of one will apply equally as well to them all.

Each of the holders embodies co-operating parts of similar construction and the holders are carried by the respective members 36.

Loosely mounted in the opening 37 and for free rotation is a member 38 which is preferably provided with a recessed portion 39 opening through one end thereof, and within this recessed portion and extending therearound adjacent the wall of the recess, is a ring 40 constructed of any suitable flexible and resilient material, preferably rubber or the like. A portion of the ring 40 projects beyond the end of the member 38, for a purpose to be hereinafter set forth.

Connected with the member 38 is a stem or projection 41 which is of an external diameter considerably less than the external diameter of the member 38, and this projection 41 has secured to it a gear 42, the latter being provided with a reduced portion 43 journaled in a bearing member 44, which latter is held within the opening 37 by means of a fastening screw 45.

A collar 46 which co-operates with the shoulder formed by the reduced portion 43 is arranged on the side of the bearing member 44 opposite the side on which the gear teeth 42 are arranged so as to hold the gear 43 against displacement.

The gear 43 is secured to the projection 41 such as by means of a key 47 and the gear 42 (see particularly Figure 5) meshes with a gear 48 which is secured to the sleeve 35 for rotation therewith so that when the sleeve 35 is rotated, a rotary motion will be imparted to the holder and to the ring 40 about their axes and independently with respect to the rotation of the members 36 about their axes or with the shaft 23.

As the shaft 23 is rotated, the members 36 will rotate and will bodily rotate the egg holders about the axis of the shaft 23 while the gear 48 will rotate the holders with respect to the members 36.

The gears 48 are rotated through the medium of gears 49 that are secured to the sleeve 35 as at 50 for rotation therewith and these gears 49 in turn mesh with the gear 28 (see particularly Figure 2), which latter receives its motion from the drive pulley 24 in the manner before described.

It will therefore be manifest that the shaft 23 with the members 36 will be given an intermittent rotation by means of the Geneva movement, comprising the drive element 31 and the driven element 33, and at the same time the holders for the eggs which are carried by the members 36 will be given a continuous rotation, with respect to the members 36.

The eggs are presented to each pair of holders in a manner that the ends of the eggs will project into the rings 40 to be frictionally gripped thereby, the insertion of the ends of the eggs into the rings causing the outer edge of the rings to be deflected, as shown.

A centering device is provided for centering the eggs with respect to the holders, and this centering device consists preferably of a conically shaped member 51 which is provided with a reduced portion 52 adapted to slide in the reduced portion 41 of the holder, and which latter is hollow. A stem 53 is connected to the centering head 51 and projects beyond the portion 41 of the holder, being preferably provided with a head 54 to prevent displacement thereof.

Encompassing the stem 53 and within the element 41 is a spring 55 which tends normally to move the centering device forwardly toward the open end of the ring 40, and the stress of the spring 55 is such that it will cause the centering device 51 to engage the end of the egg with only sufficient pressure to assist in supporting the egg and at the same time properly locating the same.

Figure 5:
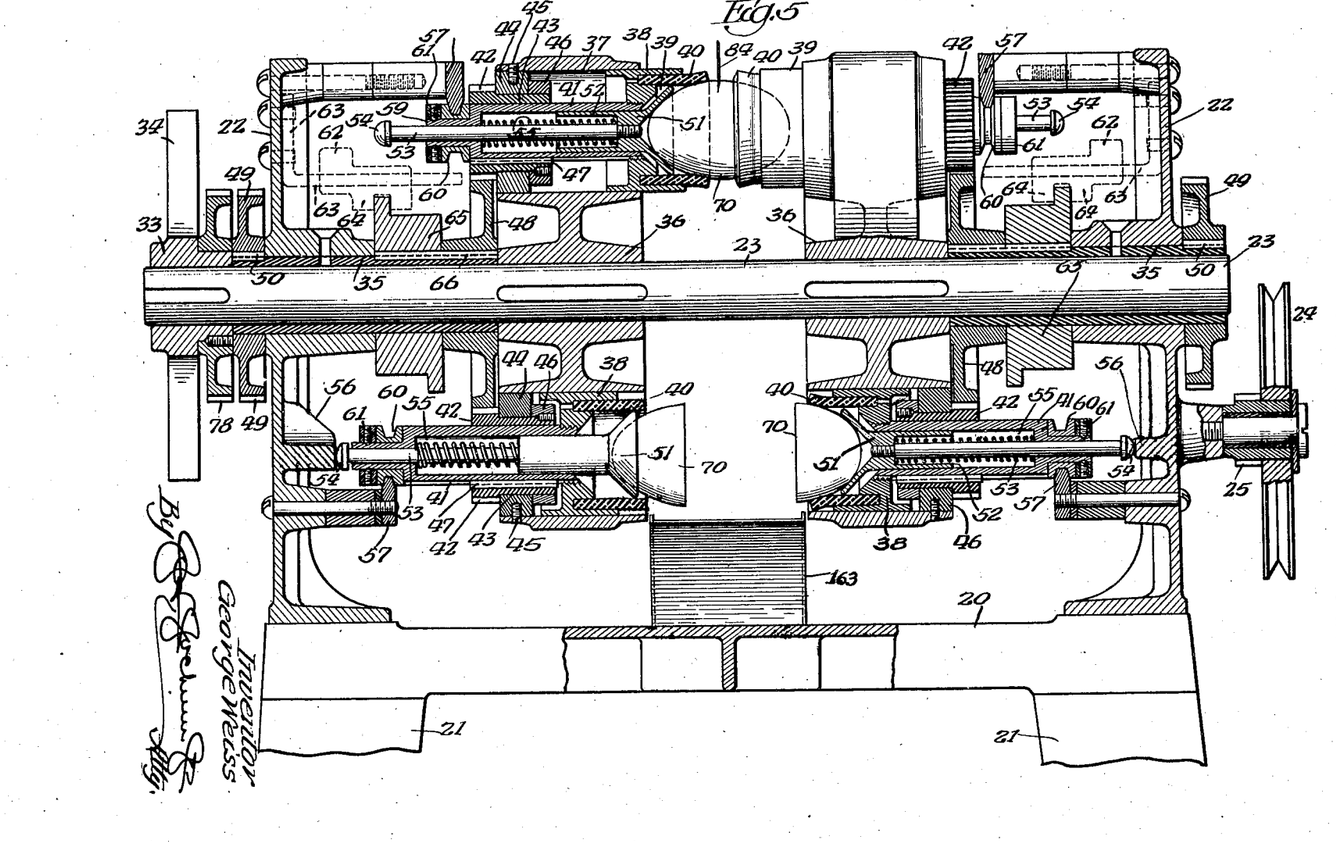
Figure 5 is a sectional view as taken on line 5—5, Figure 1.

When the egg is first presented to the holders the centering member will be moved to the position shown in Figure 5, but after the egg shell has been severed and the contents emptied therefrom, the centering member 51 will be moved forwardly by means of a cam 56 arranged within the path of movement of the head 54 on the stem 55 and at the proper station in the cycle of operation of the machine.

The egg holders are moved forwardly and backwardly in directions parallel with the longitudinal axis of the shaft 23 during the rotation of the shaft so as to grip the egg and hold the same while it is being advanced to the cutting station, then subsequently the holders are separated sufficiently to permit the contents of the egg to be emptied from the shell and by the frictional engagement between the portions of the shell and the respective rings 40, the egg shells will be separated.

After the egg shells have been opened and the contents discharged, the shells are then advanced to the ejecting station, at which time the end of the stem 53 will engage the cam 56 so as to force the centering member 51 forwardly, and the latter will then act as an ejector for ejecting the shell from the ring 40 in the holder.

During the rotation of the members 36 the egg holders embodying the member 38 and ring 40 are advanced towards and away from each other, also in directions parallel with the axis of the shaft 23 so as to cause the holders to close upon the ends of the egg and then to be separated so as to separate the shells.

This is accomplished by means of a cam 57 (see particularly Figures 2, 5 and 11) which is suitably supported and is provided with an offset portion 58 at the ends of the cam so as to permit the holders to be moved forwardly without interference.

This is accomplished preferably in the following manner. The extremity of the extension 41 of the holder is reduced as at 59 and a pulley 60 is journaled upon the reduced portion, being held in position by means of a suitable collar 61. The groove of the pulley 60 receives the active edge of the cam 57 so that as the members 36 are rotated, the pulleys 60 will travel upon the cam 57 and the cam is so arranged as to gradually move the egg holders toward each other to grip the egg, then maintain the holders against movement while the egg is being cut, and then separate the egg shells so as to discharge the contents therefrom.

After the egg holders have been separated to the fullest extent, and at the time the egg is being presented to the holders, the holders are moved forwardly from the rear end of the cam 57 to the front end and in a direction lengthwise of the axis of the shaft 23. This is accomplished in any suitable manner, but preferably by means of a member 62 which is mounted to slide upon a bracket or guide 63 suitably located. The member 62 may be provided with spaced projections 64 depending therefrom between which a cam 65 projects. The cam 65 is keyed to the sleeve 35 by means of a suitable key 66 so that when the sleeve 35 is rotated the cam 65 will be correspondingly rotated. The cam is so arranged that just at the time that the egg is presented between the holders, the members 62 will move forwardly to the position shown in Figure 2, to engage the end of the extension 41 of the holder 38 and thereby move it together with the centering member 51, bodily forward toward the egg, and this occurs at the time that the pulley 60 is being moved laterally from the rear end to the front end of the cam 57, so as to position the groove in the pulley 60 to receive the front end of the cam 57.

Obviously, and as before stated, one of these entire mechanisms is arranged on each side of the machine.

The eggs are fed to the machine in any suitable manner, preferably from a conveyor 67, which may be so arranged as to supply eggs for a series of machines. Arranged adjacent the path of movement of the conveyor 67 and at a position between two cooperating holders are brackets 68 which are spaced laterally from each other, and these brackets are provided with a seat 69 for receiving the eggs 70.

Suitably supported and arranged parallel with the shaft 23 is a shaft 71 which is fixed against rotation preferably by means of a suitable fastening device 72. Secured to the shaft 71 is a gear wheel 73, and this gear wheel is arranged between two sleeves 74, which are telescoped upon the shaft 71, the proximate ends of the sleeve terminating in close proximity to the gear 73. One of the sleeves 74 has a bearing in the framework and extends therethrough, and secured to the projecting end of the sleeve 74 is a gear wheel 75 secured to the sleeve for rotation therewith, preferably by means of a set screw 76. The gear 75 meshes with a gear 77 (see also Figure 2) which in turn meshes with a gear 78, the latter being secured to the Geneva element 33 for rotation therewith, so that upon every step of rotation of the shaft 23, the gear 75 will be given one step of rotation, and this in turn will rotate the sleeves 74.

Secured to the sleeves 74 are spaced members forming a support 79 having a hub 80, and between these members 79 the gear 73 is located. Rotatably mounted between the members 79 for bodily rotation therewith and with respect thereto, are gears 81 which mesh with the gear 73 and also rotatably mounted between the members 79 and meshing respectively with the gears 81, are gears 82. Secured to the axes of each of the gears 82 and on each side of the support 79 are cup shaped members 83, and the members 83 are so arranged that upon rotation of the support 79, the members 83 will pass between the brackets 68, as shown more clearly in Figure 7.

Figure 3:
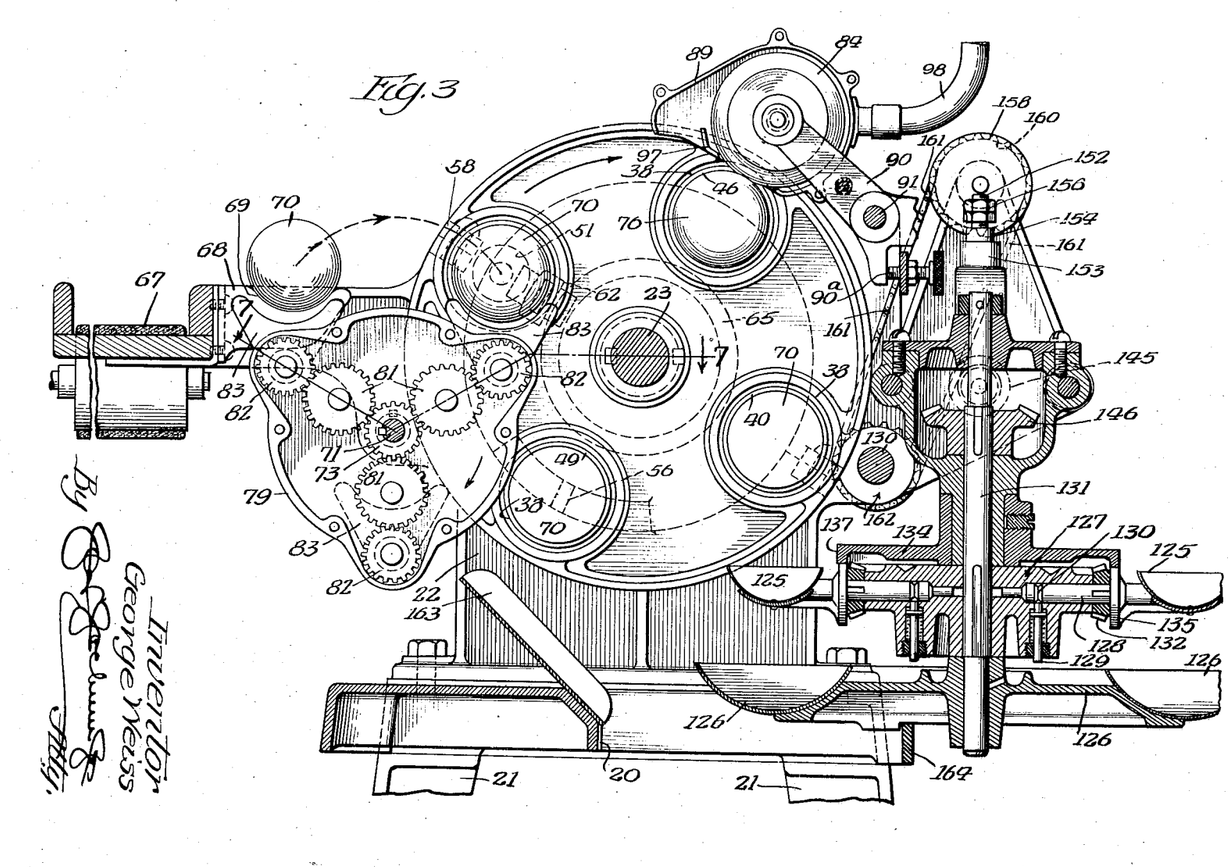
Figure 3 is a sectional view taken on line 3—3, Figure 2.

The gears 73, 81 and 82 form a planetary gear movement, and as the cup shaped lifting members 83 are connected with the axes of the gears 82 and as the gear 73 is maintained stationary, it will be manifest that upon a rotation of the support 79 together with a bodily rotation of the gears 81 and 82 about the gear 73, the cup shaped members 83 will be always maintained in an upright position as shown in Figure 3, in every position of rotation of the cup shaped lifting members 83 about the shaft 71.

As the support 79 is rotated in the direction indicated by the arrow in Figure 3, the lifting members 83 will lift one of the eggs 70 (see particularly Figure 3) from the support 68, and carry the egg in the direction and in the path indicated by the dotted line in Figure 3, to the receiving station between the egg holders. At this time the holders at the receiving station will be separated to their fullest extent so as to permit the egg to be positioned between the holders. This operation occurs upon one intermittent step of the shaft 23. During the interval of rest of the shaft, the sleeves 35 will be rotated, causing the cams 65 to rotate and these cams will cause the member 62 to be moved forwardly so as to engage the end of the holders and move them in directions towards each other to grip the egg by its ends while it is being held upon the lifting members 83. Upon the next step of rotation of the shaft 23, the egg thus gripped will be advanced to the cutting station where it will be cut by a rotating cutter 84, and from there will be advanced upon the third step of rotation to the discharging station to be advanced upon the next step of rotation to the station at which the egg shells are ejected, in the manner already described.

The lifting members 83 are maintained in a fixed relation with respect to the holders and it will be seen that in order to make one complete cycle of revolution of the shaft 23, four steps of intermittent movement are imparted thereto, while in order to make a complete cycle of rotation of the support 79 upon which the lifting members 83 are located, three steps only are necessary. Therefore, this ratio of difference between the two is compensated for by the proper gear connections.

Should it be desired to change the fixed relation of the lifting members 83 with respect to the holding members, the set screw 76 (see Figure 7) may be loosened and the support 79 may then be turned forwardly or backwardly to the desired extent, after which the set screw 76 may again be tightened.

Figure 14:
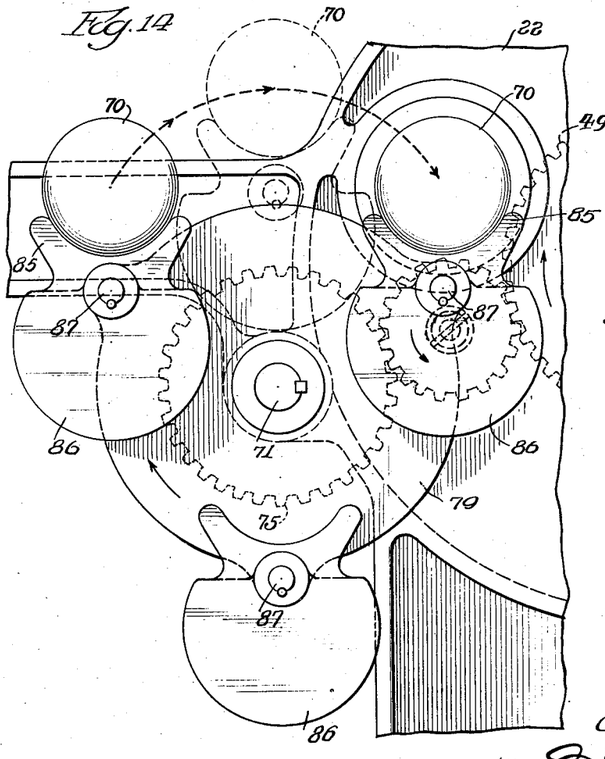
Figure 14 is a diagrammatic view of another form of egg lifting and carrying mechanism.
Figure 15:
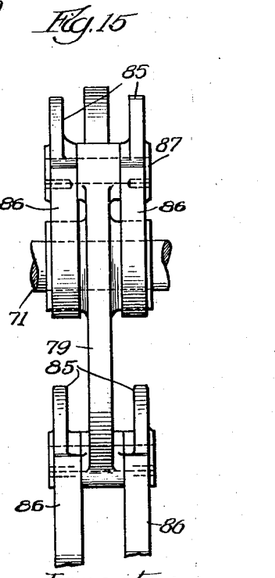
Figure 15 is an end elevation of Figure 14.
Figure 16:
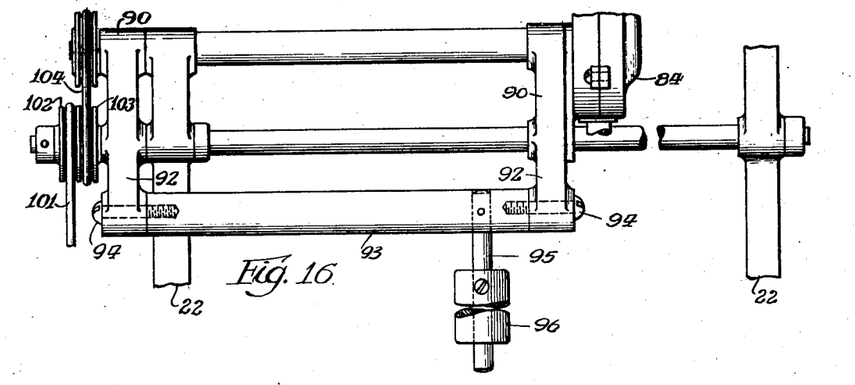
Figure 16 is a top plan view of a portion of Figure 4, and with parts broken away and parts omitted.

In the form of the invention shown in Figure 14, another form of lifting member is disclosed, wherein the planetary gear construction is omitted, and the lifting members are maintained always in an upright position with respect to the rotatable support 79 by gravity. This is accomplished preferably by providing the members 85 with weighted portions 86, so as to maintain the lifting members uprightly, causing them to swing about the pivots or axes 87, as the member 79 is rotated. In this form of the invention the support 79 consists of a single disc and the members 85 are formed in pairs, arranged on opposite sides of the disc 79 and connected by means of a shaft 88.

Figure 1:
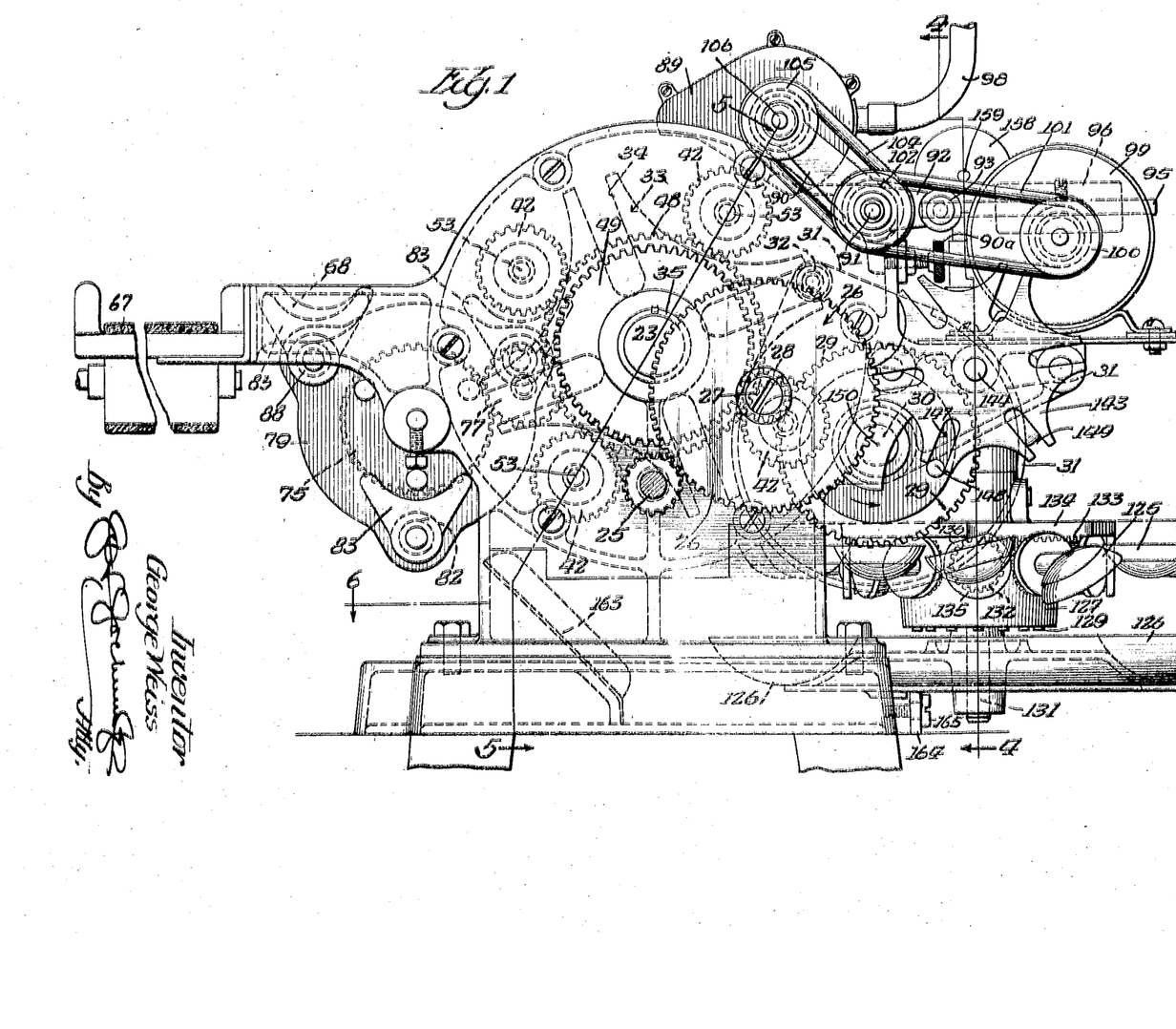
Figure 1 is a side elevation of a machine of this character constructed in accordance with the principles of this invention.
Figure 4:
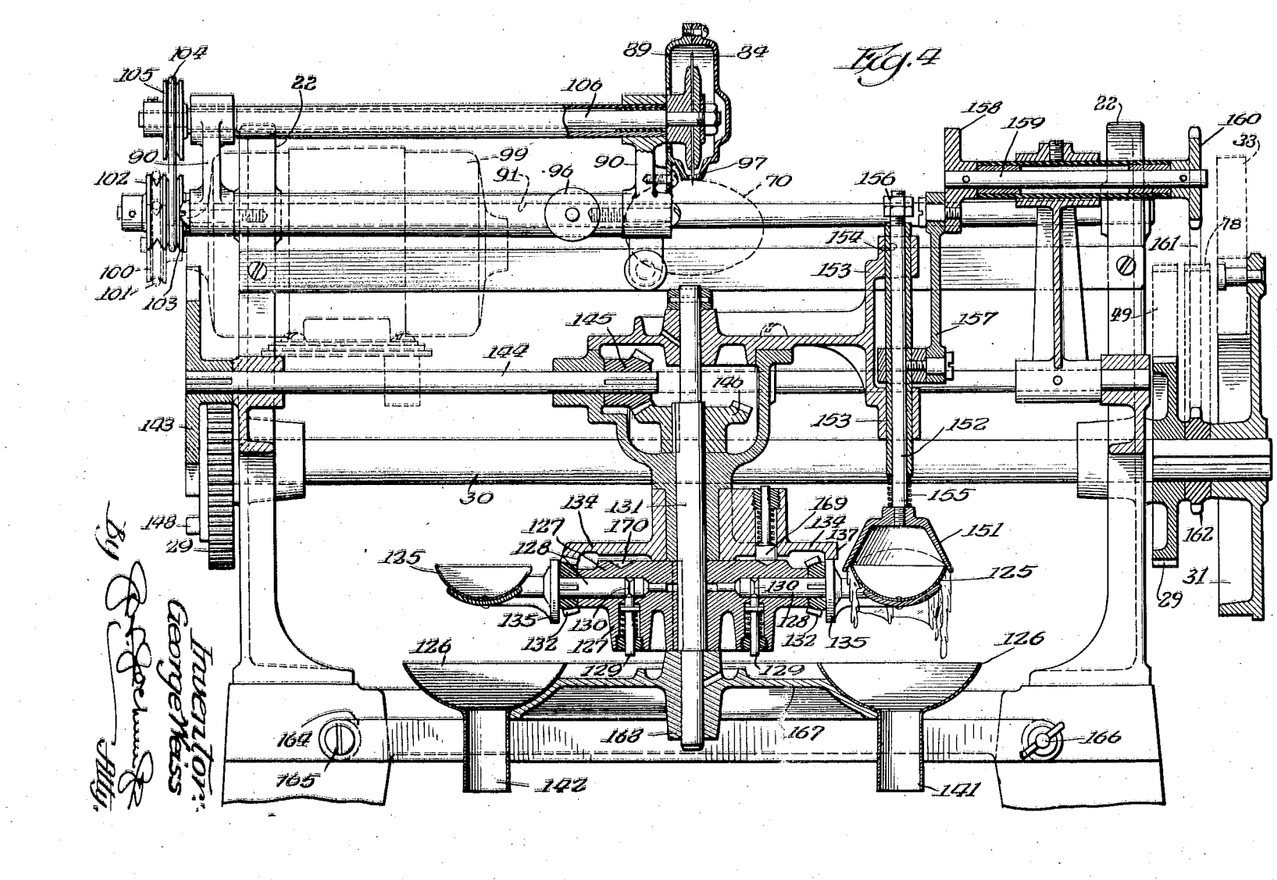
Figure 4 is a vertical sectional view taken on line 4—4, Figure 1.

In the form of the invention shown in Figures 1, 3 and 4, the cutter 84 is arranged within a housing 89 which is supported by means of arms 90 pivotally mounted as at 91, and connected with the arms 90 are extensions 92 between which a member 93 is mounted and secured by suitable fastening devices 94.

Connected to the member 93 is an arm 95 on which is arranged an adjustable counterbalancing weight 96, by means of which the cutter may be counterbalanced.

The bottom of the casing 89 is shaped to form a guide 97 adapted to rest upon the egg, as shown in Figure 4.

Leading from the casing 89 is a pipe 98, by means of which any dust created in the casing 89 by the cutting of the egg shell may be conveyed away.

The cutter is preferably operated from a high speed motor 99, suitably mounted, to the shaft of which motor is connected a pulley 100, over which a belt 101 passes. The belt 101 also passes over a pulley 102, which is connected with a pulley 103 for rotation therewith. A belt 104 passes over the pulley 103 and also over a pulley 105, which latter is secured to a shaft 106 upon which the cutter 84 is mounted.

Figures 7, 7A, 8, 9:
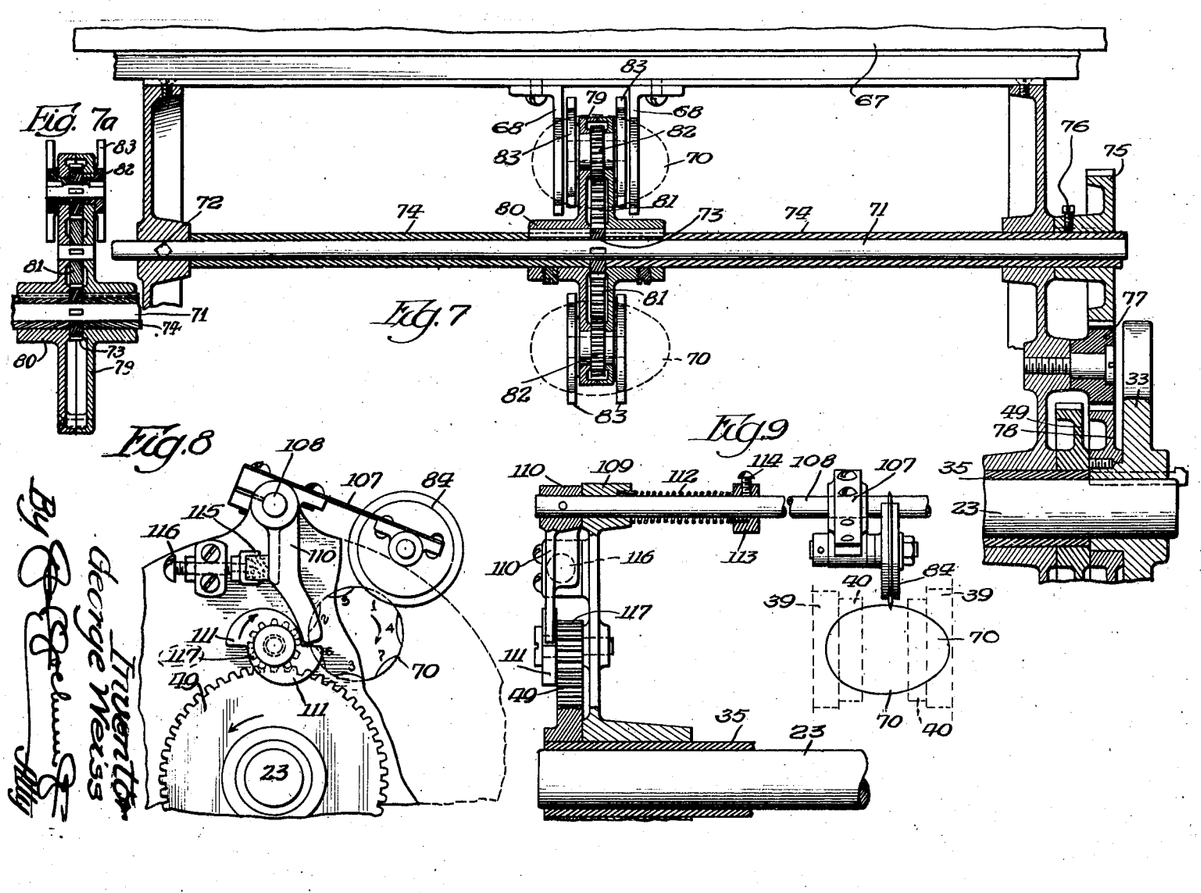
Figure 7 is a sectional view taken on line 7—7, Figure 3.
Figure 8 is a side elevation of a portion of the machine, with parts broken away, showing one form of cutter, for cutting the egg shells.
Figure 9 is a view partly in right hand elevation and partly in section of Figure 8.

In the form of the invention shown in Figure 8, the cutter 84 is mounted upon an arm 107, the latter preferably being slightly resilient and is secured to a rock shaft 108 journaled in a suitable bearing 109. An arm 110 is also secured to the shaft 108 and projects into the path of the rotary movement of a double cam shaped member 111. A spring 112 is anchored by one end to the bearing 109 and is secured to the shaft 108 for adjustment about the shaft by means of a collar 113 and a fastening device 114, by means of which the tension of the spring 112 may be provided.

This spring operates to normally move the cutter 84 bodily in a direction to contact with the egg and also to hold the arm 110 in the path of movement of the cam shaped member 111. A cushion device 115 is provided as a stop to be engaged by the arm 110, and the cushion device is adjustable by an adjusting screw 116.

The cam shaped member 111 is rotated by means of the gear 49 meshing with a gear 117 which is secured to the cam shaped member.

From an inspection of Figure 8 of the drawings, it will be seen that upon each two complete revolutions of the egg 70, the cutter will be moved toward and away from the egg so as to contact therewith and cut the shell in the manner as shown by the numbers 1 to 7 in Figure 8.

Figures 10, 10A, 11, 12, 13:
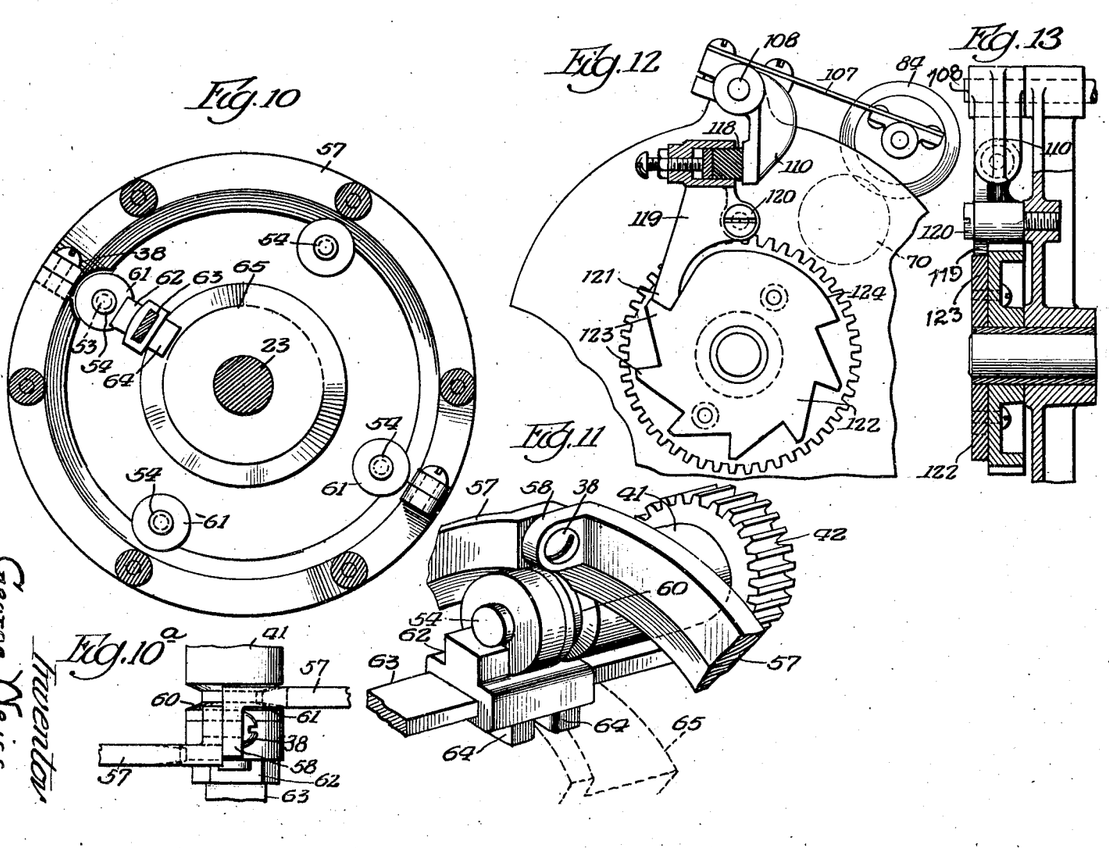
Figure 10 is a view as taken on line 10—10, Figure 2, with parts omitted.
Figure 11 is a detail perspective view of a portion of one of the cams for moving the egg holder into and out of position and of the mechanism for moving the egg holder in one direction.
Figure 12 is a view similar to Figure 8, of another form of cutter.
Figure 13 is a right hand end elevation of Figure 12.

In the form of the invention shown in Figure 12, the cutter 84 is mounted in the same manner as shown in Figure 8, with the exception that the arm 110 engages a cushioning device 118 that is carried by another arm 119, the latter being pivotally mounted as at 120. The extremity 121 of the arm 119 cooperates with a rotating member 122, having teeth 123 and an extended smooth portion 124 about its periphery, so that as the member 122 is rotated in the direction indicated by the arrow, the arm 119 will be successively engaged by the teeth 123 to raise the cutter away from the egg 70, but when the end 121 of the arm 119 passes off of the respective teeth the cutter 84 will drop into contact with the egg shell, and as the egg shell will be rotated and the cutter rotated in the directions indicated by the arrow in Figure 12, one cut will be made in the egg shell for each of the teeth 123. When the end of the arm 121 engages the portion 124 of the member 122, the cutter will be held out of engagement or active position with respect to the egg, during which time the egg holders and carrier will be advanced.

After the shell has been cut and the cut portions separated, the entire contents of the shell will be deposited into a separating machine, which latter preferably consists (see particularly Figures 3 and 4) of a series of receiving cups 125 of a size to receive the entire contents of the egg shell and also of a size that the albumen will run over the edge of the cup to be discharged into a trough shaped member 126.

The receiving cups 125 are rotatably supported by a member 127 through the medium of shafts 128 secured to the receiving cups 125 and are detachably secured to the member 127 by fastening devices 129 entering grooves 130 in the shaft so that by forcibly straining the shafts 128 lengthwise of their axes in one direction, the receiving cups 125 may be detached.

Figure 6:
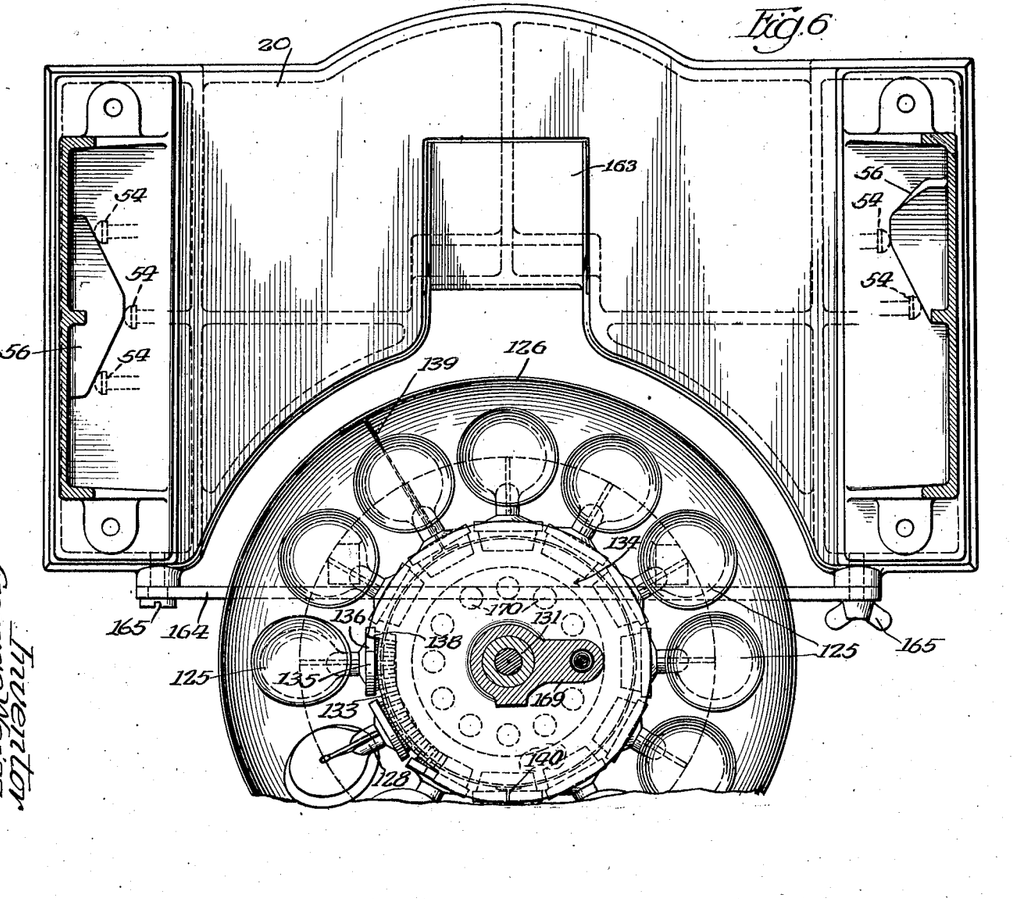
Figure 6 is a sectional view taken on line 6—6, Figure 1.

The member 127 is connected to a shaft 131 for rotation therewith and secured to each of the shafts 128 is a gear 132, which mesh with teeth 133 on a member 134, and these teeth 133 are arranged adjacent a portion only of the path of movement of the gears 132. Secured also to the shafts 128 are discs 135 having flattened portions 136 (see particularly Figure 1) and the flattened portions 136 co-operate with a flange 137 on the member 134 to lock the shafts 128 and the receiving cups 125 against axial rotation during a portion of the rotation of the member 127. When the gears 132 mesh with the teeth 133 the flattened portions 136 of the discs 135 will be opposite a cut away portion 138 (see Figure 6) of the member 134, which will permit the shafts 128 to be rotated to dump the receiving cups 125 to discharge the contents thereof into the trough 126.

The trough 126 is provided with partitions 139—140 so arranged with respect to the rotation of the member 127 and the receiving cups 125 that the albumen will be delivered into the trough shaped member 126 during a portion of the rotation of the member 127 on one side of the partitions, while the yokes will be delivered from the receiving cups 125 on the other side of the partitions, to be respectively discharged through outlets 141—142.

The shaft 131 may be rotated in any desired or suitable manner, and is given an intermittent rotation preferably by means of a Geneva movement consisting of a star or driven wheel 143 (see particularly Figures 1, 2, 3 and 4) which is secured to a shaft 144 arranged parallel with the shaft 23. To the shaft 144 is secured a gear 145 which meshes with a gear 146 that is secured to the shaft 131, and to which shaft 131 the member 127 is secured.

The Geneva element 143 is actuated by a driving element 147, having a pin 148 that enters the slots 149 in the Geneva element 143.

The member 147 is preferably secured to one of the gears 29, which is shaped to form a locking portion 150, as shown more clearly in Figure 1. Thus when the gear 29 is rotated, an intermittent rotation will be imparted to the member 127 with the receiving cups 125 supported thereby.

As a means for assisting in separating the albumen from the yolks of the eggs when they are deposited in the receiving cups 125, a substantially conical shaped stripper 151 is provided and is connected with a vertically reciprocating shaft 152 slidable in suitable bearings 153. Telescoped upon the shaft 152 is a sleeve 154, which slides in the bearings 153, and interposed between the end of the sleeve 154 and the stripper 151 is a spring 155 and the sleeve 154 is of a length considerably less than the length of the shaft 152, lock nuts 156 being provided on the free end of the shaft 152.

Connected to the sleeve 154 is a link 157, and this link is connected by one end with a crank 158 secured to a shaft 159 rotatable in suitable bearings. Secured also to the shaft 159 is a sprocket wheel 160, and over this sprocket wheel 160 passes an endless flexible belt or drive member 161, preferably in the form of a sprocket chain that also passes over a sprocket wheel 162 secured to the shaft 30 for rotation therewith, so that as the shaft 30 is rotated, the shaft 159 will be rotated and a vertical reciprocatory movement will be imparted to the stripper member 151.

The stripper member 151 has a fixed station, while the member 127 is intermittently rotated so as to successively bring the receiving cups 125 into a position to be operated upon by the stripper 151, and this is accomplished by the intermittent rotation of the member 127.

When the receiving cup 125 with its contents is positioned beneath the stripper 151 the latter will operate to assist in separating the albumen as shown in Figure 4. After the albumen has been separated and when the stripper member is raised, another step of rotation will be imparted to the member 127 to present another receiving cup 125 beneath the stripper 151.

After the albumen has been separated from the yolk and when the member 127 has rotated a sufficient distance to cause the teeth 133 to engage the gears 132 to rotate the latter, the receiving cups 125 will be inverted (see particularly Figure 1) so as to dump the yolk therefrom into the trough shaped member on the opposite side of the partitions, thereby separating the albumen and yolk.

After the contents of the eggs have been discharged from the shell, and when the egg shells have been advanced to the discharging station they will be ejected from the holders to fall upon an incline or chute 163 to be delivered from the machine, as shown more clearly in Figures 1 and 3.

The troughs 126 may be removably held in position in any suitable manner, but preferably by means of a bar or rod 164, which is pivotally mounted by one end as at 165 and detachably secured to a part of the frame structure by its other end as at 166. This bar or rod passes under the support 167 for the trough 126, and the end of the shaft 131 is loosely journaled in a bearing 168 of the support 167, so that by dropping the rod 164 the support 167 may be readily removed.

Figure 2:
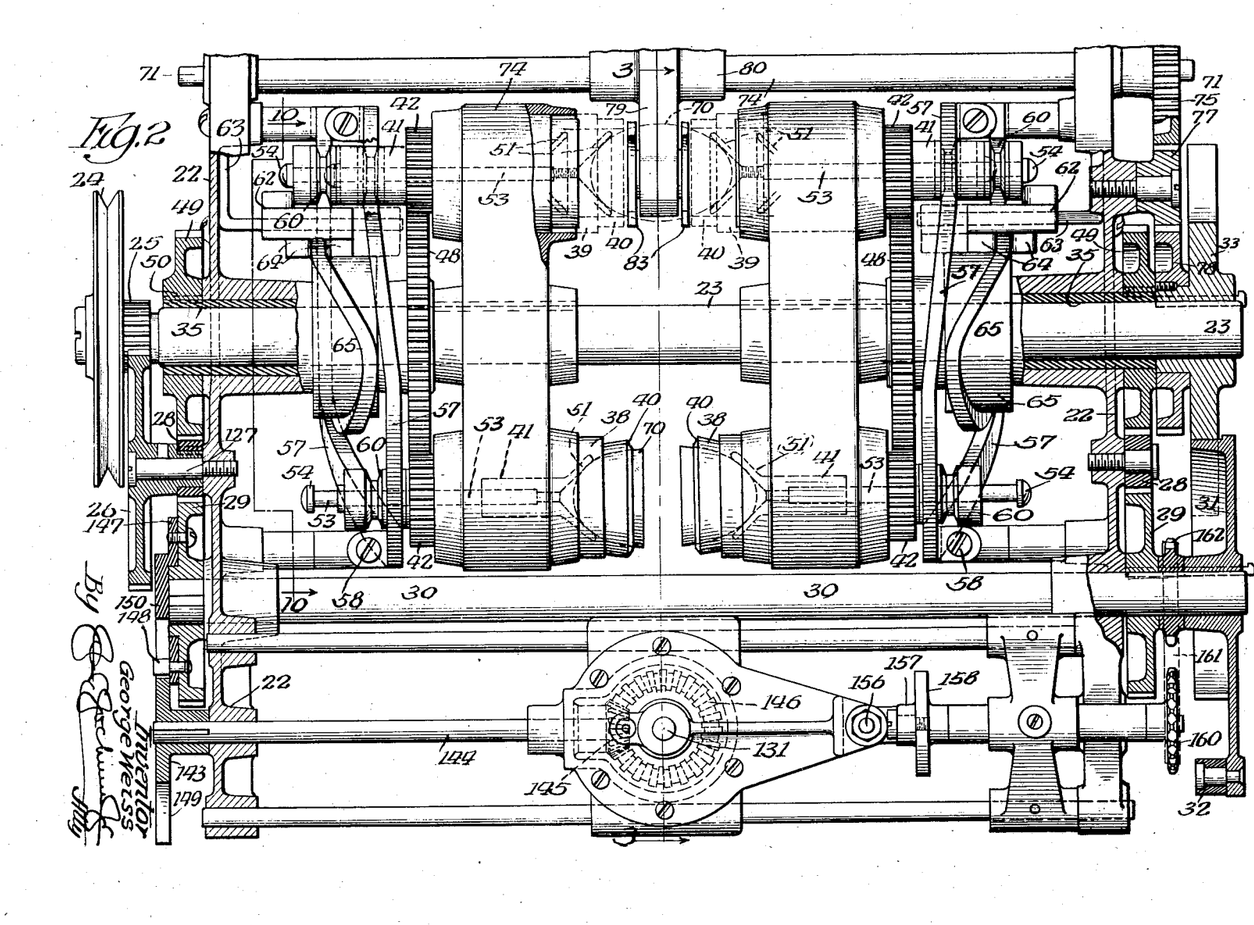
Figure 2 is a top plan view of Figure 1, with parts broken away, parts in horizontal section and with parts omitted.

It is thought that the operation of this machine will be clearly understood from the foregoing, but briefly stated it is as follows, reference being had particularly to Figures 1, 2 and 3.

The eggs are supplied by the conveyor 67 and are lifted by the operator separately and placed upon the brackets 68. Upon the first intermittent step of rotation of the shaft 23, the support 79 will be rotated to cause the lifting members 83 to lift the egg from the bracket 68 and move it in the path of movement indicated by the arrow in Figure 3, to present it between co-operating holders on the intermittently rotatable members 36. At this time in the cycle of operation of the machine, the cam 65 will move the member 62 forwardly so as to close the holders upon the ends of the egg and cause the elastic rings 40 to frictionally grip the egg at its end, the centering member 51 operating to contact with the end of the egg and center it in the holder. This will occur at the time when one pair of holders is adjacent the offset portion at the ends of the cam 57 (see also Figure 11). The cam 57 will then, as the supports 36 are rotated, cause the co-operating holders to close further upon the egg to frictionally grip the same and the holders will be held in this position by the cams during the time that the egg is advanced from the receiving to the cutting station. At this point the cutter 84 will operate upon the egg shell to sever it. Upon the next step of advancing movement of the shaft 23 and members 36, the cut egg will be advanced to the discharge station, and as it approaches the discharging station the cams 57 will separate the parts of the egg shells to permit the contents of the egg to be entirely discharged therefrom into one of the receiving separating cups 125. Upon another step of advancing movement, the egg shells will be moved to the ejecting station, at which time the cams 56 operate upon the centering members 51 and cause them to eject the shells.

After the contents of the eggs have been deposited into one of the separating cups 125, the albumen will run over the edge of the cup into one portion of the receiving trough 126, and the support 127 carrying the receiving separating cups will be advanced until they are successively brought into a position to be operated by the stripper 151. At this time the stripper 151 will be lowered as shown in Figure 4, to assist in separating the albumen from the yolk. The stripper will then be raised and at this time another step of rotary motion will be imparted to the member 127. At the proper time the receiving cups 125 holding the yolk from which the albumen has been separated, will then be inverted and the yolk will be delivered into the receiving trough on the other side of the partition.

The cams 65 operate to move the members 62 forwardly at the proper time in the cycle of operation of the machine and they also operate to withdraw the members 62 to position them with respect to the next pair of holders to engage the stems or portions 41 thereof, to advance the latter.

If desired and as a means for insuring the proper positioning of the separating cups 125 with respect to the stripper 151, a spring controlled fastening device 169 may be provided, which is adapted to enter openings 170 in the member 127.

While the preferred forms of the invention have been herein shown and described, it is to be understood that various changes may be made in the details of construction and in the combination and arrangement of the several parts, within the scope of the claims, without departing from the spirit of this invention.

What is claimed as new is:

1. In a machine for opening eggs to remove the contents thereof, a carrier for the eggs, means for advancing the carrier, means for holding the eggs upon the carrier, means for actuating the last said means, means for positioning the eggs to be engaged by said holding means, the said positioning means embodying a rotatable support, a plurality of egg receivers mounted upon said support for bodily rotation therewith and for pivotal movement with respect thereto, means for maintaining said receivers against being inverted while bodily rotating with said support, and means for rotating the support.

2. In a machine for opening eggs to remove the contents thereof, a carrier for the eggs, means for advancing the carrier, means for holding the eggs upon the carrier, means for actuating the last said means, means for positioning the eggs to be engaged by said holding means, the said positioning means embodying a rotatable support, a plurality of egg receivers mounted upon said support for bodily rotation therewith and for pivotal movement with respect thereto, means embodying planetary gear mechanism for maintaining said receivers against being inverted while bodily rotating with said support, and means for rotating the support.

3. In a machine for opening eggs to remove the contents thereof, a carrier for the eggs, means for advancing the carrier, a stationary holder for the eggs, means between said holder and said carrier for lifting the egg from the former and delivering it to the latter, the last said means embodying a rotatable support, cup shaped members pivotally mounted upon said support and bodily rotatable with the support and about the axis of the latter, and means for maintaining said cup shaped members against being inverted while being bodily rotated about the axis of the support.

4. In a machine for opening eggs to remove the contents thereof, a carrier for the eggs, means for advancing the carrier, a stationary holder for the eggs, means between said holder and said carrier for lifting the egg from the former and delivering it to the latter, the last said means embodying a rotatable support, cup shaped members pivotally mounted upon said support and bodily rotatable with the support and about the axis of the latter, and a planetary gear connection between the axis of said support and each of said cup shaped members for maintaining the latter against being inverted during their bodily rotation about said axis.

5. In a machine for opening eggs to remove the contents thereof, a carrier for the eggs, means for advancing the carrier, a stationary holder for the eggs, means between said holder and said carrier for lifting the egg from the former and delivering it to the latter, the last said means embodying a rotatable support, cup shaped members pivotally mounted upon said support and bodily rotatable with the support and about the axis of the latter, and a planetary gear mechanism between the axis of said support and the pivot of each of said cup shaped members operating to maintain the cup shaped members uprightly during their bodily rotation about the axis of the support.

6. In a machine for opening eggs to remove the contents thereof, a carrier for the eggs, means for advancing the carrier, a stationary holder for the eggs, means disposed between said carrier and said holder for lifting the egg from the latter and delivering it to the former, the last said means embodying a rotatable support, cup shaped members connected with the support for bodily movement with the support about the axis of the latter and for pivotal movement with respect to the support, said members embodying laterally spaced portions between which the said stationary support passes as said members are advanced, and means for maintaining said cup shaped members against being inverted about their pivots as they are bodily advanced with the support.

7. In a machine for opening eggs to remove the contents thereof, a carrier for the eggs, means for advancing the carrier, a stationary holder for the eggs, means disposed between said carrier and said holder for lifting the egg from the latter and delivering it to the former, the last said means embodying a rotatable support, cup shaped members connected with the support for bodily movement with the support about the axis of the latter and for pivotal movement with respect to the support, said members embodying laterally spaced portions between which the said stationary support passes as said members are advanced, and means embodying planetary gear mechanism between the axis of said rotatable support and each of the pivots of said cup shaped members for maintaining the latter against being inverted during their bodily movement about the axis of said support.

8. A machine of the character described embodying a holder for the eggs, said holder embodying a ring of resilient material into which the end of the egg is adapted to be inserted to be frictionally and circumferentially gripped thereby only in a zone spaced from the ends of the egg, a support for said ring, and a centering member for centering the egg with respect to said ring.

9. A machine of the character described embodying a holder for the eggs, said holder embodying a ring of resilient material into which the end of the egg is adapted to be inserted to be frictionally and circumferentially gripped thereby only in a zone spaced from the ends of the egg, a support for said ring, and a resiliently yielding centering member for centering the egg with respect to said ring.

10. A machine of the character described embodying a holder for the eggs, said holder embodying a ring of resilient material into which the end of the egg is adapted to be inserted to be frictionally and circumferentially gripped thereby only in a zone spaced from the ends of the egg, a support for said ring, a centering member for centering the egg with respect to said ring, and means for causing said centering member to eject the shell at a predetermined time in the cycle of operation of the machine.

11. A machine of the character described embodying a holder for the eggs, said holder embodying a ring of resilient material into which the end of the egg is adapted to be inserted to be frictionally and circumferentially gripped thereby only in a zone spaced from the ends of the egg, a support for said ring, a centering member within said ring for centering the egg with respect thereto, said centering member embodying a cup shaped portion for receiving the end of the egg.

12. In a machine of the character described, a carrier for the eggs, means for advancing the carrier, a rotary cutter for cutting the shell, means mounting the cutter for bodily movements towards and away from the egg, means for imparting such bodily movement to the cutter, the last said means embodying a rotatable toothed member, an arm connected with said cutter and co-operating with the teeth of said member, and means for imparting a high speed of rotation to the cutter.

13. In a machine of the character described, a carrier, holders on the carrier for the articles to be operated upon, means for advancing the carrier, a stationary holder for the articles, and means intermediate the carrier and the said stationary holder for delivering the articles from the latter to the former, the last said means embodying a rotatable support, lifting members mounted on the support for bodily movement therewith and for pivotal movement with respect thereto and independently with respect to each other, said lifting members operating to deliver the articles from the stationary holder to the said holders on the carrier, said lifting members maintaining a fixed relation to the holders on the carrier, and means whereby the fixed position of the said lifting members with respect to the holders on said carrier may be varied at will.

14. In a machine of the character described, a carrier, holders on the carrier for the articles to be operated upon, means for advancing the carrier, a stationary holder for the articles, means intermediate the carrier and the said stationary holder for delivering the articles from the latter to the former, the last said means embodying a rotatable support, lifting members mounted on the support for bodily movement therewith and for pivotal movement with respect thereto, said lifting members operating to deliver the articles from the stationary holder to the said holders on the carrier, said lifting members maintaining a fixed relation to the holders on the carrier, means whereby the fixed position of the said lifting members with respect to the holders on said carrier may be varied at will, and means for maintaining said lifting members against being inverted by movement about their pivots during the bodily rotation of the lifting members about the axis of said support.

15. In a machine for opening eggs to remove the contents thereof, a carrier for the eggs, means for advancing the carrier, means for holding the eggs upon the carrier, means for actuating the last said means, means for positioning the eggs to be engaged by said holding means, the said positioning means embodying a rotatable support, a plurality of egg receivers mounted upon said support for bodily rotation therewith and for pivotal movement with respect thereto, means for maintaining said receivers against being inverted while bodily rotating with said support, and means for rotating the support.

16. In a machine for opening eggs to remove the contents thereof, a carrier for the eggs, means for advancing the carrier, a stationary holder for the eggs, means between the said holder and said carrier for lifting the egg from the former and delivering it to the latter, the last said means embodying a rotatable support, cup shaped members pivotally mounted upon said support and bodily rotatable with the support and about the axis of the latter, and a connection between the axis of said support and each of said cup shaped members for maintaining the latter against being inverted during their bodily rotation about said axis.

17. In a machine for opening eggs to remove the contents thereof, a carrier for the eggs, means for advancing the carrier, a stationary holder for the eggs, means between said holder and said carrier for lifting the egg from the former and delivering it to the latter, the last said means embodying a rotatable support, cup shaped members pivotally mounted upon said support and bodily rotatable with the support and about the axis of the latter, and means between the axis of said support and the pivot of each of said cup shaped members operating to maintain the cup shaped members uprightly during their bodily rotation about the axis of the support.

18. In a machine for opening eggs to remove the contents thereof, a carrier for the eggs, means for advancing the carrier, a stationary holder for the eggs, means disposed between the carrier and said holder for lifting the egg from the former and delivering it to the latter, the last said means embodying a rotatable support, cup shaped members connected with the support for bodily movement with the support about the axis of the latter and for pivotal movement with respect to the support, said means embodying laterally spaced portions between which the said stationary support passes as the said members are advanced, and means between the axis of said rotatable support and each of the pivots of said cup shaped members for maintaining the latter against being inverted during their bodily movement about the axis of said support.

19. In a machine for opening eggs to remove the contents thereof, a carrier for the eggs, egg holding means on the carrier, means for advancing the carrier, means for receiving and presenting the eggs to the said carrier, the last said means embodying a rotatable support provided with seats for receiving the eggs, said seats being movable with and with respect to the support, and means for rotating the said support to present the eggs to the said holding means.

20. In a machine for opening eggs to remove the contents thereof, a carrier for the eggs, egg holding means on the carrier, means for advancing the carrier, means for receiving and presenting the eggs to the said carrier, the last said means embodying a rotatable support provided with seats for receiving the eggs, and means for rotating the said support to present the eggs to the said holding means, the said seats embodying elements connected with the third recited means for bodily movement therewith and for pivotal movement with respect thereto.

GEORGE WEISS.